Patented Feb. 27, 1951

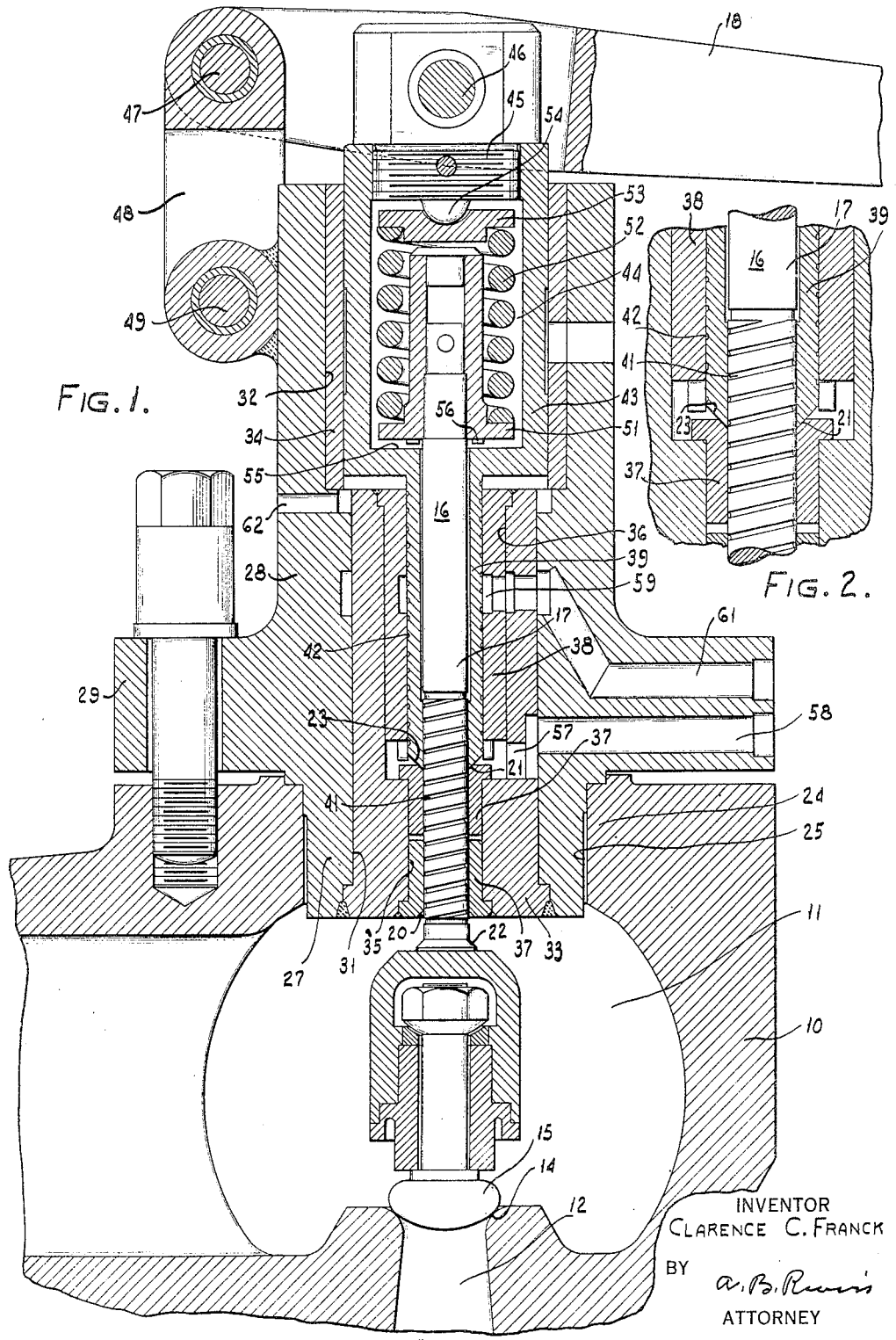

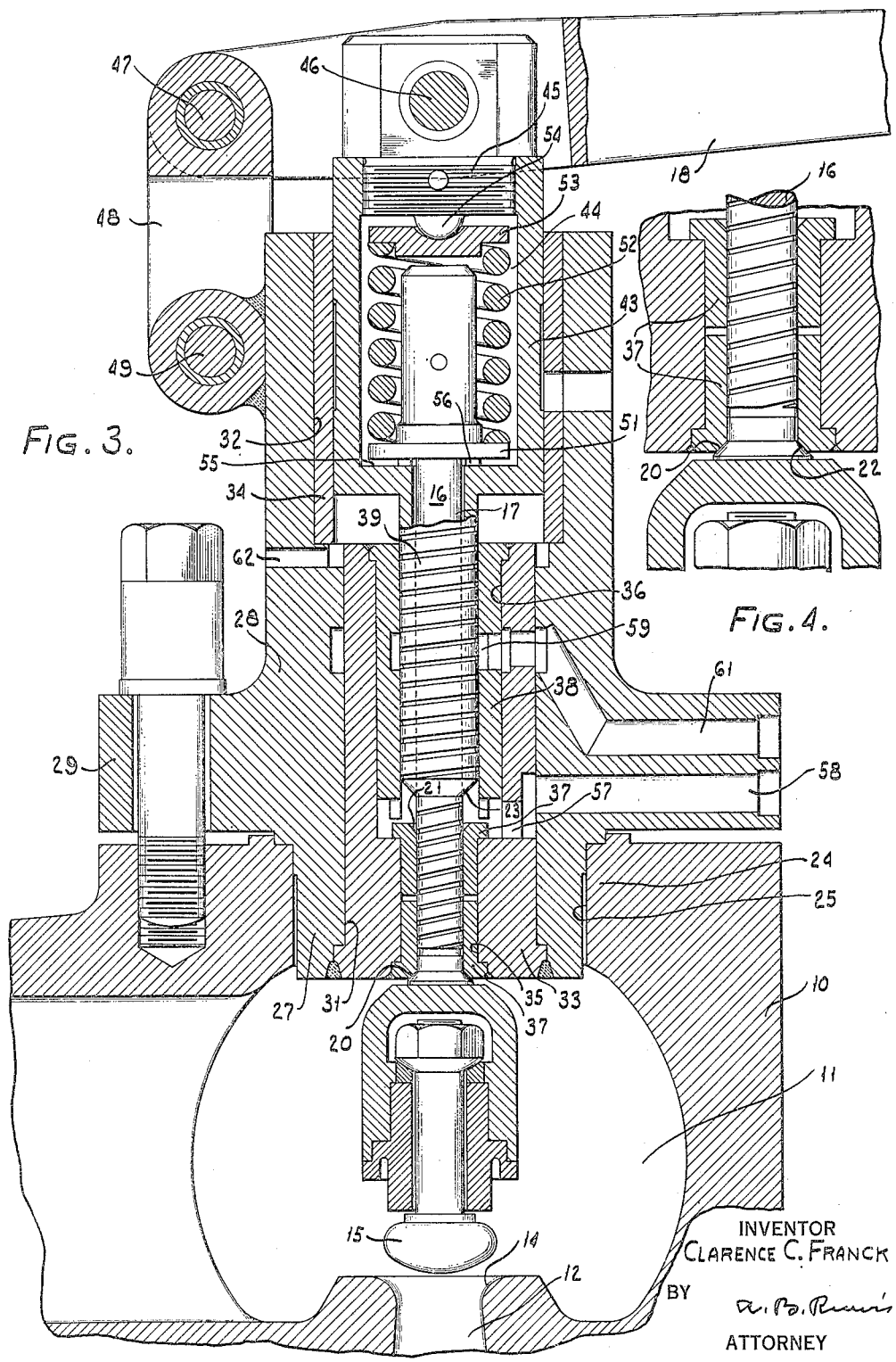

2,543,102

UNITED STATES PATENT OFFICE 2,543,102

VALVE STEM SEAL

Clarence C. Franck, Swarthmore, Pa., assignor to Westinghouse Electric Corporation, East Pittsburgh, Pa., a corporation of Pennsylvania Application April 29, 1947, Serial No. 744,583

2 Claims. (Cl. 251—32)

The invention relates to a valve for controlling the flow of steam or the like, particularly high-temperature steam, to a prime mover and operated by a stem, and it has for an object to provide sealing means effective to prevent escape of steam about the stem both when the valve is closed and when it is wide open.

Steam turbines, particularly of the high temperature and high pressure type, present the problem of leakage about the stems of both the admission and throttle valves. Sticking of such valves should be avoided in the interest of protecting the turbine. Provision of sufficeint clearance about the stem to assure free movement entails leakage, particularly under high temperature and pressure conditions, with the possibility of clogging due to salt deposition. In accordance with the present invention, I provide the valve stem with sealing valves which are closed to prevent leakage about the stem when the valve is closed and is wide open. Accordingly, a further object of the invention is to provide a pair of valves for the valve stem of a flow-controlling elastic fluid valve to prevent leakage about the stem, one of the valves of the pair being closed when the flow-controlling valve is closed and the other of the valves of the pair being closed when the flow-controlling valve is wide open.

These and other objects are effected by the invention as will be apparent from the following description and claims taken in connection with the accompanying drawings, forming a part of this application, in which:

Fig. 1 is a sectional view showing a valve with means for sealing the stem against leakage when the valve is closed;

Fig. 2 is a detail sectional view drawn to larger scale and showing the valve effective to seal the stem against leakage when the flow-controlling valve is closed;

Fig. 3 is a view similar to Fig. 1, but showing the valve in wide open position; and Fig. 4 is a sectional detail view showing the valve means for sealing the stem against leakage when the flow-controlling valve is in wide open position.

Referring to the drawings, there is shown a shell or body 10 providing a chamber 11 having a passage 12 through which steam is discharged from the chamber. The inlet end of the passage has a valve seat 14 with which cooperates the plug valve 15 for controlling the flow of steam through the passage from the chest or chamber.

The plug valve 15 is moved by means of a stem mechanism, at 16, including a stem element 17 having its inner end connected to the plug valve and extending through the wall of the chest or chamber opposite to the valve seat 14. The outer end of the stem mechanism is operatively connected to the operating member or lever 18. As will be more fully pointed out, the chamber wall is provided with an inner inwardly-facing conical valve seat 20 and with an outer outwardly-facing valve seat 21 with which cooperate, respectively, the conical valve portions 22 and 23 to avoid or greatly minimize the leakage of steam about the stem when the plug valve is fully closed or is wide open, the valve portion 22 engaging the seat 20 when the plug valve is wide open, and the valve portion 23 engaging the seat 21 when such valve is fully closed. As it is necessary for both the valve portion 23 and the plug valve 15 to seat, as will be more fully hereinafter described, the means operating for this purpose includes a spring through which closing effort is exerted on the plug valve.

As shown in the drawings, the chest or chamber wall 24 opposite to the seat 14 has an opening 25 within which is spigoted the lower end portion 27 of the bonnet structure 28 having an external flange 29 bolted to the body or shell 10.

The bonnet structure has an inner cylindrical bore 31 and an outer cylindrical bore 32 of larger diameter. A tubular or barrel member 33 is secured in the bore 31, and a bushing 34 fits in the bore 32.

The tubular or barrel member 33 has an inner or lower cylindrical bore 35 and an outer bore 36 of larger diameter, the bores 35 and 36 being axially aligned and both being coaxial with respect to the barrel member. A set of bushings 37 are secured in the bore 35 and a bushing 38 is mounted in the bore 36, the set of bushings 37 being hereafter collectively referred to as "bushing" since they function as a single bushing.

The valve stem mechanism, at 16, comprises the stem member 17 and the telescoping sleeve member 39, both the stem and the sleeve members preferably being spirally grooved, as indicated at 41 and 42, to maintain distribution of pressure about the members to keep the latter centered with respect to the bushings 37 and 38 and thereby maintain the members free to move while defining uniform clearances minimizing leakage. At its upper end, the sleeve element 39 is formed with a cup-like portion 43 slidably fitting in the bushing 34 and providing a cylindrical chamber 44 extending about the upper end of the stem 17, and closed at its outer end by the plug 45.

The operating member or lever 18 is pivotally connected, at 46, to the plug 45 and it is fulcrumed, at 47, to a link 48 pivotally connected, at 49, to the bonnet structure 28.

Within the chamber 44, the upper end of the stem 17 has attached thereto the spring seat 51 for the lower end of the spring 52, whose upper end is engaged by the follower 53 having thrust engagement, at 54, with respect to the plug 45.

From the structure described, it will be apparent that the lever or beam 18 is positively connected to the sleeve element 39 of the stem mechanism, at 18, and that it is capable of transmitting thrust, through the spring 52 to the stem 17, to close the plug valve 15. To open the closed plug valve, the sleeve member 39 is moved outwardly until the abutment surface 55 formed by the bottom of the chamber 44 engages abutments 56 extending downwardly from the spring seat 51, whereupon continued upward or outward movement of the sleeve is positively transmitted to the stem to move the plug valve in an opening direction.

The inwardly-facing conical valve seat 20 and the outwardly-facing conical valve seat 21 are carried at the inner and outer ends of the bushing 37, the outwardly-facing conical valve portion 22 is provided on the stem 17 and the inwardly-facing conical valve portion 23 is formed at the inner or lower end of the sleeve element 39. Therefore, as the plug valve 15 is seated by the stem mechanism due to thrust transmitted thereto through the spring 52, the stem mechanism may continue to move, after the plug valve is seated, to engage the conical valve portion 23 with the seat 21, whereby, with the plug valve closed, the stem is positively sealed by the valve means, comprising the valve portion 23 and the valve seat 21, against the leakage of steam about the valve stem from the chest or chamber. On the other hand, with the plug valve moved to the wide-open position shown in Fig. 3, due to outward movement of the operating member or lever 18, the conical valve portion 22 engages the conical valve seat 20 to seal the stem 17 against leakage of steam from the chest.

The lower end of the bushing 38 terminates short of the lower end of the bore 36 and the barrel member 33 has openings or spaces providing a leak-off chamber 57 in communication with the leak-off passage 58 formed in the bonnet structure. Preferably, an annular groove 59 is formed in the bushing 38 about the sleeve element 39 and is connected by openings formed in the bushing and in the barrel member with the leak-off passage 61 in the bonnet structure. A passage 62 formed in the bonnet structure provides for continuous communication of the space below the sleeve element enlargement 43 with the atmosphere, whereby air is free to enter and leave the space below the enlargement without interfering with freedom of the sleeve element to move.

While I have shown my invention in but one form, it will be obvious to those skilled in the art that it is not so limited, but is susceptible of various changes and modifications without departing from the spirit thereof.

What I claim is:

1. In a prime mover valve arrangement, means providing a steam chamber having a discharge passage with a valve seat at its inlet end; a plug valve cooperating with the seat; stem mechanism for moving the plug valve; said stem mechanism including a stem member having its inner end connected to the plug valve and extending through the chamber wall opposite to said seat, an actuating member, a spring interposed between the members for transmitting thrust from the actuating member to the stem member to move the latter to close the plug valve, and abutments carried by said members and engageable to transmit thrust from the actuating member to the stem member to move the latter to open the plug valve; inwardly and outwardly-facing valve seats carried by said wall and encompassing the stem member; a valve portion carried by the actuating member and engageable with the outwardly-facing seat incident to motion of such member relative to the stem member with compression of the spring after the plug valve is engaged with its seat; and a valve portion carried by the stem member and engageable with the inwardly-facing valve seat when the plug valve is in open position.

2. In a prime mover valve arrangement, means providing a steam chamber having a discharge passage with a valve seat at its inlet end; a plug valve cooperating with the seat; stem mechanism for moving the plug valve; said stem mechanism including a stem member having its inner end connected to the plug valve and extending through the chamber wall opposite to said seat, an actuating sleeve member telescoping the stem member, a spring interposed between the members for transmitting thrust from the actuating member to the stem member to move the latter to close the plug valve, and abutments carried by said members and engageable to transmit thrust from the actuating member to the stem member to move the latter to open the plug valve; inwardly- and outwardly-facing conical valve seats carried by said wall and encompassing the stem member; a conical valve portion carried by the inner end of the actuating member and engageable with the outwardly-facing seat incident to motion of such member relative to the stem member with compression of the spring after the plug valve is engaged with its seat; and an outwardly-facing conical valve portion carried by the stem member and engageable with the inwardly-facing valve seat when the plug valve is in its open position.

CLARENCE C. FRANCK.

REFERENCES CITED

The following references are of record in the file of this patent:

UNITED STATES PATENTS

| Number | Name | Date |
| --- | --- | --- |
| 1,144,758 | Desmond | June 29, 1915 |
| 1,277,297 | Davis | Aug. 27, 1918 |